(12) United States Patent
Raza et al.

(10) Patent No.: US 6,625,711 B1
(45) Date of Patent: Sep. 23, 2003

(54) METHOD AND/OR ARCHITECTURE FOR IMPLEMENTING QUEUE EXPANSION IN MULTIQUEUE DEVICES

(75) Inventors: S. Babar Raza, Milpitas, CA (US); Somnath Paul, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/714,441

(22) Filed: Nov. 16, 2000

(51) Int. Cl.[7] .............................................. G06F 12/00
(52) U.S. Cl. ...................................... 711/173; 711/154
(58) Field of Search ........................ 711/154, 170–173, 711/5; 710/52–56, 310

(56) References Cited

U.S. PATENT DOCUMENTS

| | | | | |
|---|---|---|---|---|
| 5,121,485 A | * | 6/1992 | Ujiie | 711/119 |
| 5,185,879 A | * | 2/1993 | Yamada et al. | 711/118 |
| 5,640,515 A | * | 6/1997 | Park | 710/52 |
| 5,812,875 A | * | 9/1998 | Eneboe | 710/20 |
| 5,859,718 A | * | 1/1999 | Yamamoto et al. | 359/128 |
| 5,870,572 A | * | 2/1999 | Garcia | 710/129 |
| 5,872,787 A | * | 2/1999 | Cooperman et al. | 370/412 |
| 6,215,769 B1 | * | 4/2001 | Ghani et al. | 370/230 |
| 6,292,877 B1 | * | 9/2001 | Ryan | 711/169 |
| 6,295,295 B1 | * | 9/2001 | Wicklund | 370/392 |
| 6,339,596 B1 | * | 1/2002 | Kozaki et al. | 370/395.7 |
| 6,526,495 B1 | * | 2/2003 | Sevalia et al. | 711/173 |

OTHER PUBLICATIONS

S. Babar Raza et al., "Architecture For Implementing Virtual Multiqueue Fifos", U.S. Ser. No. 09/676,704, Filed Sep. 29, 2000.

S. Babar Raza et al., "Method and Logic For Storing and Extracting In–Band Multicast Port Information Stored Along with the Data in a Single Memory Without Memory Read Cycle Overhead", U.S. Ser. No. 09/676,171, Filed Sep. 29, 2000.

S. Babar Raza et al., "Logic for Generating Multicast/Unicast Address(es)", U.S. Ser. No. 09/676,706, Filed Sep. 29, 2000.

S. Babar Raza et al., "Logic for Initializing the Depth of the Queue Pointer Memory", U.S. Ser. No. 09/676,705, Filed Sep. 29, 2000.

S. Babar Raza et al., "Method and Logic for Initializing the Forward–Pointer Memory During Normal Operation of the Device as a Background Process", U.S. Ser. No. 09/676,170, Filed Sep. 29, 2000.

S. Babar Raza et al., "Logic for Providing Arbitration for Synchronous Dual–Port Memory", U.S. Ser. No. 09/676,169, Filed Sep. 29, 2000.

* cited by examiner

*Primary Examiner*—Donald Sparks
*Assistant Examiner*—Nasser Moazzami
(74) *Attorney, Agent, or Firm*—Christopher P. Maiorana, P.C.

(57) ABSTRACT

An apparatus comprising a plurality of devices configured to store and present data to a plurality of queues. Each of the plurality of devices may be configured to receive (i) one or more first control signals configured to control data transfer and (ii) one or more second control signals to configure the plurality of queues. A particular one or more of the plurality of devices may be selected in response to one or more device identification bits.

22 Claims, 4 Drawing Sheets

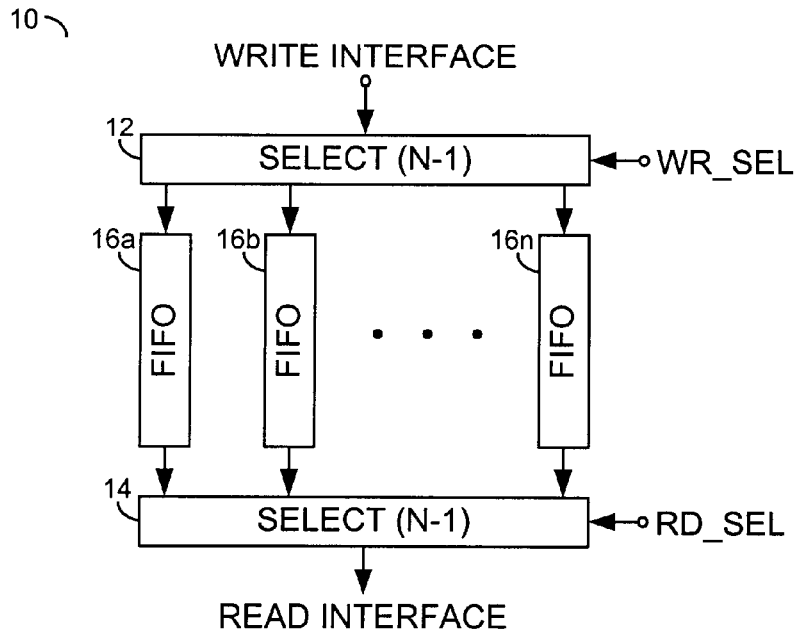
FIG. 1
(CONVENTIONAL)
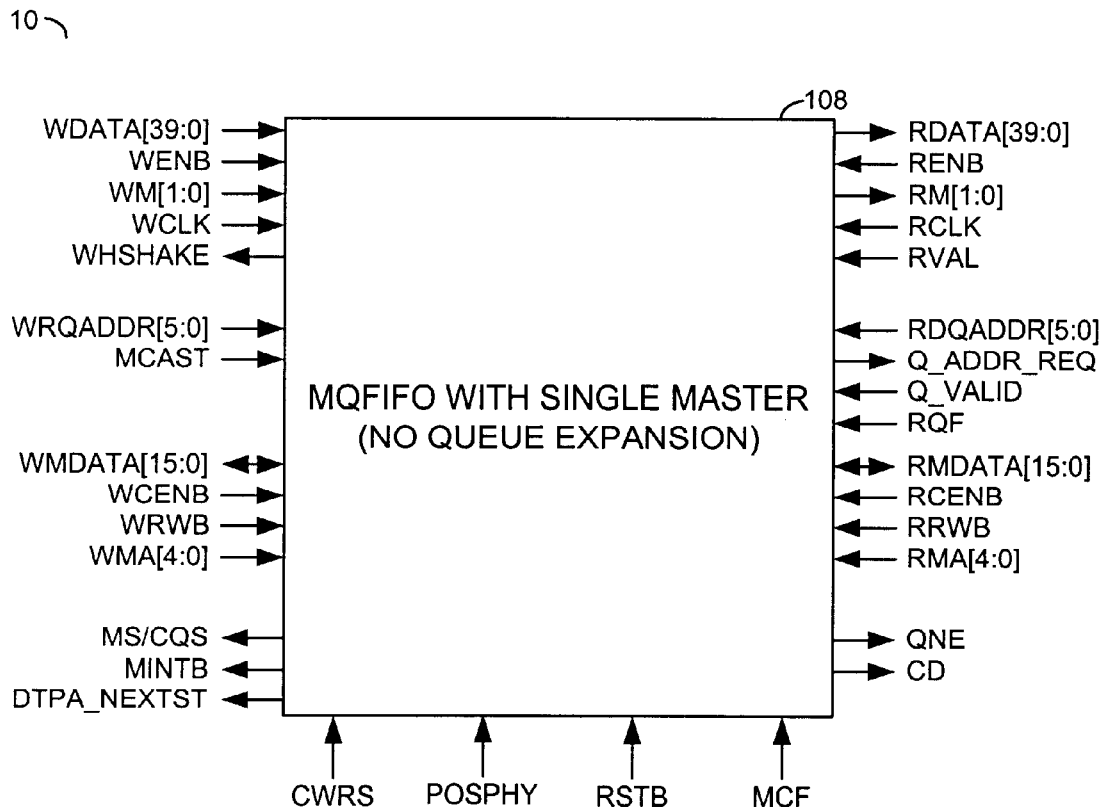
FIG. 2
(CONVENTIONAL)

US 6,625,711 B1

METHOD AND/OR ARCHITECTURE FOR IMPLEMENTING QUEUE EXPANSION IN MULTIQUEUE DEVICES

CROSS REFERENCE TO RELATED APPLICATIONS

The present application may relate to application Ser. No. 09/676,704, filed Sep. 29, 2000, Ser. No. 09/676,171, filed Sep. 29, 2000, Ser. No. 09/676,706, filed Sep. 29, 2000, Ser. No. 09/676,705, filed Sep. 29, 2000, Ser. No. 09/676,170, filed Sep. 29, 2000 and Ser. No. 09/676,169, filed Sep. 29, 2000, which are each hereby incorporated by reference in their entirety.

FIELD OF THE INVENTION

The present invention relates to a method and/or architecture for implementing multiqueue devices generally and, more particularly, to a method and/or architecture for implementing queue expansion of multiqueue devices. BACKGROUND OF THE INVENTION Referring to FIG. 1, a conventional system 10 for implementing multiqueue first-in first-out (FIFO) devices is shown. The system 10 includes a selector section 12, a selector section 14 and a number of memory sections 16a–16n. The memory sections 16a–16n are each implemented as FIFO devices. The conventional system implements each of the FIFOs 16a–16n as an independent physical memory.

The selector section 12 receives data from a write interface and presents the data to one of the memory sections 16a–16n in response to a write select signal WR_SEL. The selector section 12 selects one of the FIFOs 16a–16n based on the signal WR_SEL. The incoming data is then stored into the appropriate FIFO 16a–16n. Similarly, the selector section 14 presents data to a read interface from one of the memory sections 16a–16n in response to a read select signal RD_SEL. The selector section 14 selects one of the FIFOs 16a–16n based on the signal RD-SEL and reads the data from the appropriate FIFO 16a–16n.

Referring to FIG. 2, a diagram of the control signals of the system 10 implementing a single master device implementation is shown. The multiqueue FIFO 10 is implemented without queue expansion capabilities. The FIFO 10 has a number of write signals (that are shown beginning with W), a number of read signals (that are shown starting with a R), and a number of other signals. The current definition of control and status signals of a single master cannot support queue expansion.

SUMMARY OF THE INVENTION

The present invention concerns an apparatus comprising a plurality of devices configured to store and present data to a plurality of queues. Each of the plurality of devices may be configured to receive (i) one or more first control signals configured to control data transfer and (ii) one or more second control signals to configure the plurality of queues. A particular one or more of the plurality of devices may be selected in response to one or more device identification bits.

The objects, features and advantages of the present invention include providing a method and/or architecture for queue expansion of multiqueue devices that may provide (i) device identification (ID) inputs for determining queue/register address most significant bits (MSB) that may include (a) write queue address expansion most significant bits for writing into the expanded queues, (b) write management register address expansion most significant bits for accessing registers belonging to other appropriate devices, (c) read queue address expansion most significant bits for reading from the expanded queues, and/or (d) read management register address expansion most significant bits for accessing registers belonging to the other appropriate devices, (ii) tristatable output data buses and control buses for arbitration, (iii) an interface for synchronous status polling across devices, (iv) a faster clock synchronization interface, and/or (v) variable size packet handling capacity.

BRIEF DESCRIPTION OF THE DRAWINGS

These and other objects, features and advantages of the present invention will be apparent from the following detailed description and the appended claims and drawings in which:

FIG. 1 is a block diagram of a conventional multiqueue FIFO;

FIG. 2 is a detailed block diagram of the multiqueue FIFO of FIG. 1 implemented with a single master device;

DETAILED DESCRIPTION OF THE PREFERRED EMBODIMENTS

Figure 3:
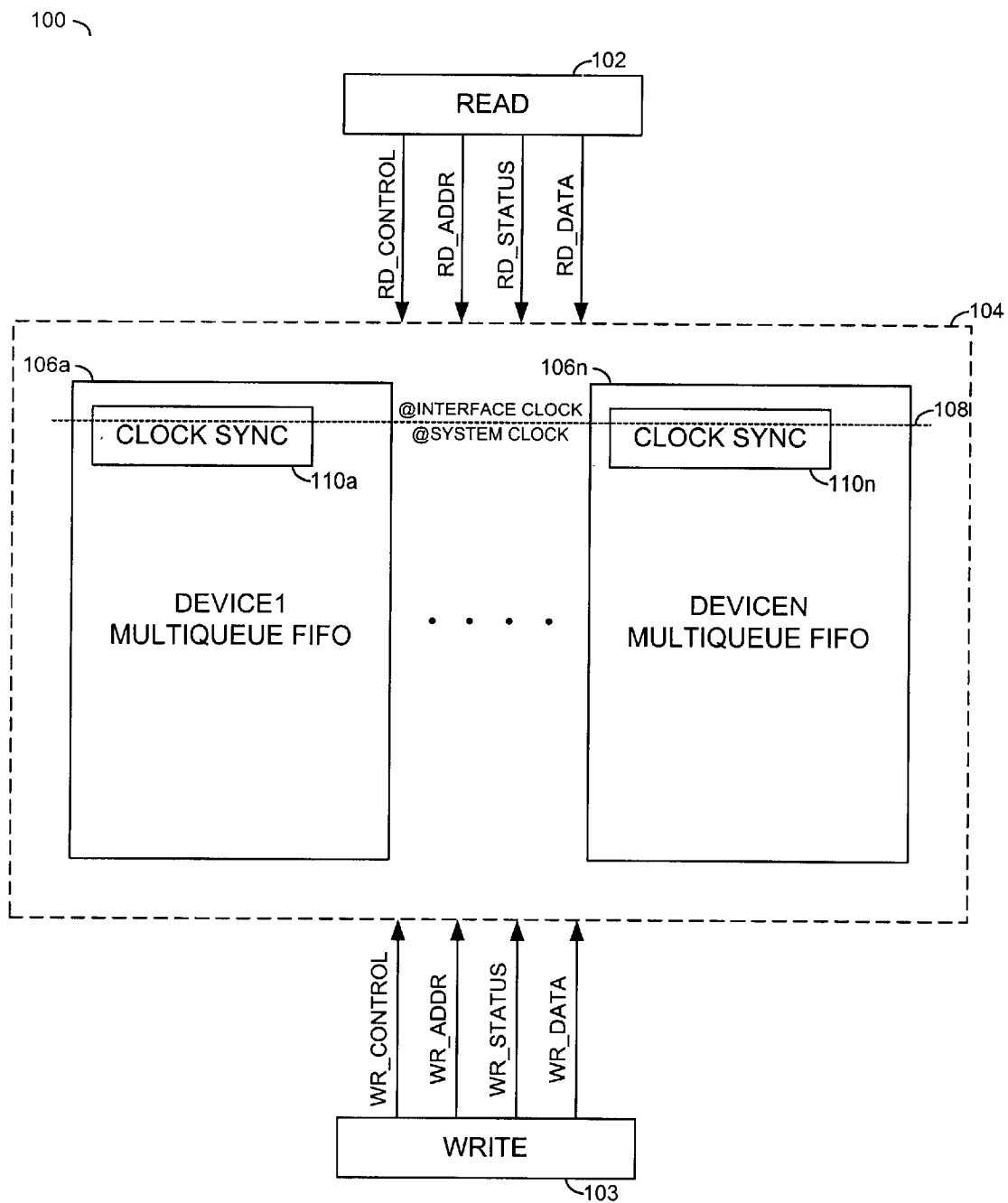
FIG. 3 is a block diagram illustrating a context of the present invention.

Referring to FIG. 3, a block diagram of a system (or circuit) 100 is shown in accordance with a preferred embodiment of the present invention. The circuit 100 may implement an out-of-band look-ahead arbitration method for transferring data bus control between multiple devices while in a queue expansion mode. Additionally, the circuit 100 may implement such control without a clock cycle penalty.

The system 100 generally comprises a read device 102, a write device 103 and a memory section 104. The memory section 104 generally comprises a number of devices 106a–106n. Each of the devices 106a–106n may be implemented as a multiqueue FIFO device. A boundary 108 shows an interface between a portion of the devices 106a–106n that operate at a first clock (e.g., a system clock) and a second portion that operates at a second clock (e.g., an interface clock). Additionally, each of the multiqueue FIFO devices 106a–106n may comprise a clock synchronization block (or circuit) 110 that may synchronize the two clock domains.

The read device 102 may present a signal (e.g., RD_CONTROL) and a signal (e.g., RD_ADDR) to the memory section 104. The read device 102 may also present/receive a signal (e.g., RD_STATUS) to/from the memory section 104. Additionally, the read device 102 may receive data (e.g., RD_DATA) from the memory section 104. The write device 103 may present a signal (e.g., WR_CONTROL) and a signal (e.g., WR_ADDR) to the memory section 104. The write device 103 may also present/receive a signal (e.g., WR_STATUS) to/from the memory section 104. Additionally, the write device 103 may present data (e.g., WR_DATA) to the memory section 104. Each of the various signals of the system 100 may be implemented as a multi-bit and/or single-bit signal in order to meet the criteria of a particular implementation.

Figure 4:
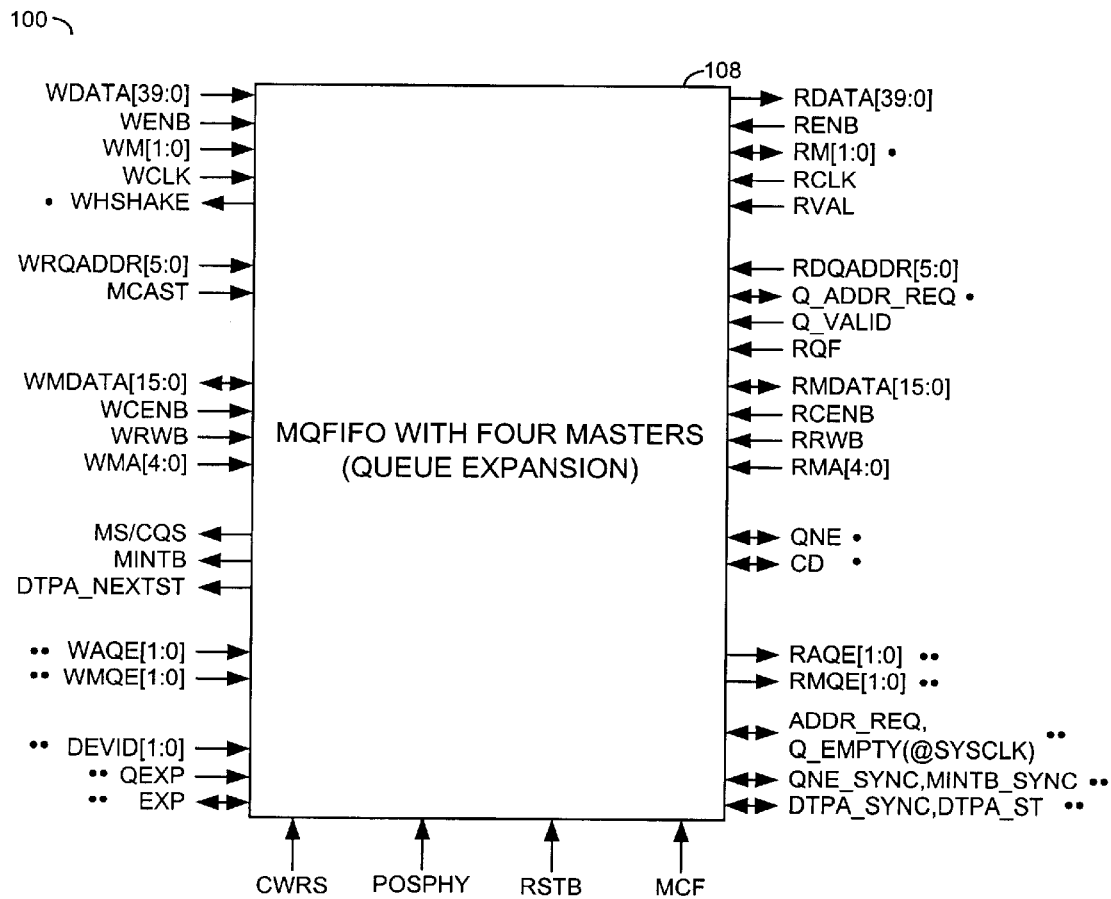
FIG. 4 is a block diagram of a number of control signals to implement a multiple master multiqueue FIFO implementation.

Referring to FIG. 4, a block diagram of a circuit 100 is shown in accordance with the present invention. In one example, the circuit 100 may be implemented as a multi-queue FIFO with four master devices. Additionally, the circuit 100 may allow for queue expansion. The circuit 100 may have a number of signals that have been modified, or are completely new when compared with the circuit 10 of FIG. 2. In particular, the signal WHSHAKE, the signal RM[1:0], the signal Q_ADDR_REQ, the signal QNE and the signal CD have been modified to be bidirectional signals. A number of new signals have been added to allow for queue expansion with four master devices. Specifically, the signals WAQE[1:0], WMQE[1:0], DEVID[1:0], QEXP, EXP, RAQE[1:0], RMQE[1:0], ADDR_REQ, Q_EMPTY (@SYSCLK), QNE_SYNC, MINTB_SYNC, DTPA_SYNC, DTPA_ST have been added. However, any number of signals may be modified and/or added to meet the criteria of a particular implementation. Moreover, each of the various signals of the circuit 100 may be implemented as single-bit and/or multi-bit signals in a parallel or serial configuration. The signals having the notation "@SYSCLK" are generally clocked by the system clock.

While FIG. 4 may illustrate additional pins for cascading four of the devices 106a–106n, the circuit 100 is not limited to the four devices 106a–106n. In particular, a fewer number or a greater number of the devices 106a–106n may be implemented accordingly to meet the design criteria of a particular implementation. An appropriate number and/or configuration of interface pins may be implemented, respectively.

Figure 5:
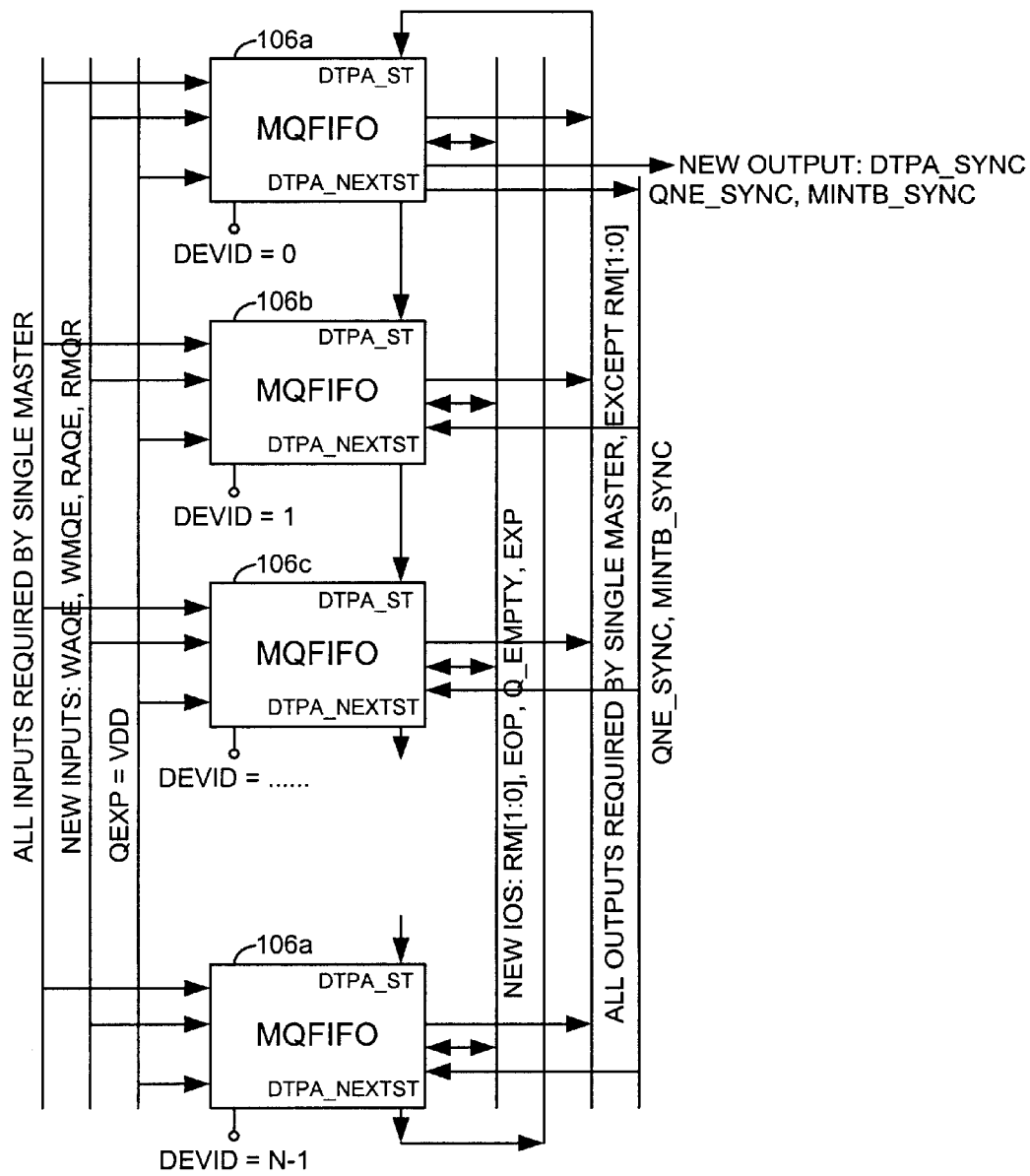
FIG. 5 is a detailed block diagram of the present invention.

Referring to FIG. 5, a more detailed diagram of the circuit 100 is shown. FIG. 5 may illustrate queue expansion by cascading a number of the multiqueue devices 106a–106n. The present invention relates to expansion of queues for multiqueue devices by cascading the devices 106a–106n. The circuit 100 may define an architecture to implement such multiqueue expansion.

Conventional multiqueue devices can only implement a limited number of queues. The circuit 100 may provide an architecture for realizing N times the number of attached queues by cascading N such devices, where N is an integer. Each device 106a–106n is generally assigned a unique identification value (e.g., DEVID), and is programmed for master configuration. For example, when cascading 4 devices, 2 bits of the signal DEVID may be required. For N bits of the signal DEVID, queue expansion for up to $2^N$ devices may be implemented. Each of the devices 106a–106n may only validate an access when the corresponding expanded address space is the same as the signal DEVID of the particular multiqueue FIFO 106a–106n.

The input pin QEXP of each device 106a–106n may be connected to an active state to indicate that the circuit 100 is in the queue expansion mode. Each of the multiqueue FIFOs 106a–106n may also require a number of addresses. Specifically, each of the multiqueue FIFOs 106a–106n may receive the signals write queue address (e.g., WAQE), write management register address (e.g., WMQE), read queue address (e.g., RAQE) and read management register address (e.g., RMQE). Each of the signals WAQE, WMQE, RAQE and RMQE may be implemented as queue expansion signals. Each of the queue expansion signals WAQE, WMQE and RMQE may have a number of queue expansion bits. The queue expansion bits may be compared with a particular device ID (e.g., DEVID) of each of the devices 106a–106n. The queue expansion bits may be implemented to select an appropriate device 106a–106n. Additionally, the queue expansion signals WAQE, WMQE, RAQE and RMQE may be only required during a queue expansion mode of operation.

Each of the multiqueue FIFOs 106a–106n may interface with the bidirectional signals RM[1:0], EOP, Q_EMPTY, and EXP. Each of the addresses may be expanded by a same number of bits as the signal DEVID. Standard inputs and outputs of the circuit 100 may be wired together, as if the cascaded devices 106a–106n represent one single device to external devices. The data outputs of the multiqueue FIFOs 106a–106n may be implemented as tristate outputs to allow the presentation of data from one device at a time. The circuit 100 may provide self-arbitration of required output drivers (not shown). The circuit 100 may also allow for variable packet size handling capacity.

Appropriate arbitration methods ensure that there are no multiple writes on any of the various write pins. In one example, the circuit 100 may implement a wait cycle between driving of a particular bus by two of the devices 106a–106n. However, such a wait state is generally optional. Additional implementations of the circuit 100 may include back-to-back reads, or a gap cycle between two sequential reads.

Existing control output signals may be implemented as typical I/Os with the exception of the signal MS/CQS. When one of the devices (e.g., 106a) drives the control signals, the other devices (e.g., 106b–106n) listen to keep track of the status of the remaining devices. Such an implementation may allow the multiqueue FIFOs 106a–106n to operate synchronously. The devices 106a–106n are generally synchronized by various signals. The signal EXP is outputted by one multiqueue device (e.g., 106a) to the remaining multiqueue devices (e.g., 106b–106n). In such an example, the device 106a generally communicates which clock (read clock or write clock) is chosen as the system clock. Details of which can be found in the related cross reference applications. The signal ADDR_REQ (@SYSCLK), together with the signal RM (which indicates an end of packet EOP) and the signals Q_EMPTY allow the read queue address to be processed sequentially by all the devices 106a–106n.

Figure 6:
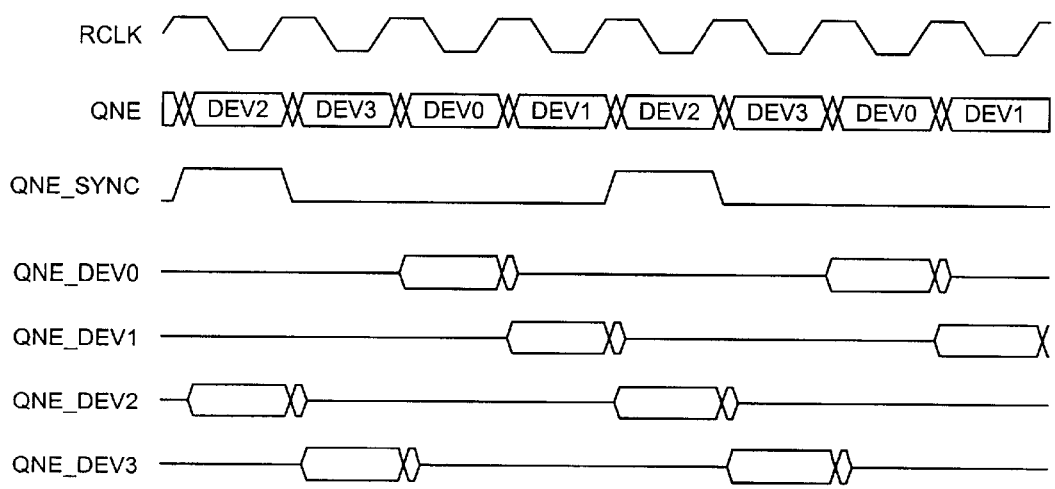
FIG. 6 is a timing diagram illustrating an operation of the present invention.

Referring to FIG. 6, a timing diagram 200 illustrating an operation of the present invention is shown. The timing diagram 200 may illustrate status polling for queue expansion of a number of devices. A signal (e.g., RCLK) may illustrate a read clock pulse. A signal (e.g., QNE) may illustrate the effective status of the system 100 (e.g., the device 106a–106n). In one example, the signal QNE may be implemented as a queue not enable signal configured to indicate an enabled/not enabled state of the system 100. For example, the signal QNE may indicate an effective status of all the devices (e.g., DEV0, DEV1, DEV2 or DEV3) of the timing diagram 200. In one example, the signal QNE may be implemented as a wired AND of a number of queue not enable signals (e.g., QNE_DEV0, QNE_DEV1, QNE_DEV2 and/or QEN_DEV3). Additionally, the signals QNE_DEV0, QNE_DEV1, QNE_DEV2 and QNE_DEV3 may illustrate status polling of the various devices 106a–106n. A signal (e.g., QNE_SYNC) may indicate which device (e.g., a particular one of the devices DEV0, DEV1, DEV2 or DEV3) may present an output.

The present invention may allow two methods of communicating status information for each multiqueue FIFO 106a–106n. The status information may also be communicated in a synchronous manner. One method may require three pins where all of the interface signals may be implemented as point-to-point signals. Another method may require a single pin where the interface signal may be implemented as point-to-multipoint signal. The status signals (e.g., the signal QNE and the signal MINTB) may be polled in a burst manner with the help of the control signals QNE_SYNC and MINTB_SYNC, respectively. Such status polling is shown in FIG. 4 and FIG. 6, for expansion up to four multiqueue devices.

The signal QNE_SYNC may indicate when each device outputs the status with respect to the signal. The control signals QNE_SYNC and MINTB_SYNC may allow an external device to compute the QNE and MINTB information for each multiqueue devices 106a–106n. The data port (e.g., packet-over-SONET physical layer (POS-PHY), supported by a status pin) information for each of the device 106a–106n is also similarly communicated with the exception that it forms a closed loop daisy chain with the help of signals DTPA_ST and DTPA_NEXTST. The signal DTPA_SYNC, outputted by the multiqueue device 106a, provides a point-to-point signal bearing the timing information for the signal DTPA.

The circuit 100 may implement two kinds of arbitration. The first arbitration method may allow the devices 106a–106n to directly arbitrate based on the expansion address. For example, the data read out through the management interface will depend on the management register address expansion most significant bits (e.g., WMQE or RMQE). Similarly, arbitration of the signal WHSHAKE depends on the write queue address expansion most significant bits.

The second arbitration method may involve early prediction, especially when an end at an access is not known. Such a method may require the devices 106a–106n to act synchronously with respect to events. The read data is arbitrated using such a method. The read arbitration allows for variable size packets to be passed through, and also allows a dual clock system. An EOP indication (via the clock signal ADDR_REQ@SYSCLK) and the queue empty indication (via the clock signal Q_EMPTY@SYSCLK) information are communicated to allow such a lookahead operation.

The circuit 100 may provide a multiqueue expansion architecture implementing device ID inputs (e.g., the signal DEVID) for deciding queue/register address MSB bits. The circuit 100 may specifically implement write queue address expansion bits for writing into the expanded queues, write management register address expansion bits for accessing registers belonging to the other devices, read queue address expansion bits for reading from the expanded queues, and/or read management register address expansion bits for accessing registers belonging to the other devices. The circuit 100 may further implement tristatable output data buses and output control buses for arbitration. The circuit 100 may implement an interface for synchronous status polling across devices. The circuit 100 may allow for a faster clock synchronization interface. The circuit 100 may also allow for variable size packet handling capacity.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of devices configured to store and present data to a plurality of queues where each of the plurality of devices is configured to receive (i) one or more first control signals configured to control data transfer and (ii) one or more second control signals to configure said plurality of queues, wherein a particular one or more of said plurality of devices is selected in response to one or more device identification bits and one or more of said one or more first and second control signals are bidirectional.

2. The apparatus according to claim 1, wherein said apparatus comprises a multiqueue expansion architecture.

3. The apparatus according to claim 1, wherein said device identification bits are configured to compare queue/register address most significant bits.

4. The apparatus according to claim 1, wherein said apparatus includes write queue address expansion most significant bits configured to control writing into the queues.

5. The apparatus according to claim 1, wherein said apparatus includes write management register address expansion most significant bits configured to control accesses to one or more registers belonging to the plurality of devices.

6. The apparatus according to claim 1, wherein said apparatus includes read queue address expansion most significant bits configured to control reading from the queues.

7. The apparatus according to claim 1, wherein said apparatus comprises read management register address expansion most significant bits configured to control accesses to one or more registers belonging to the plurality of devices.

8. The apparatus according to claim 1, wherein each of said plurality of devices interfaces tristatable output data busses for arbitration.

9. The apparatus according to claim 1, wherein each of said plurality of devices interfaces tristatable output control busses for arbitration.

10. The apparatus according to claim 1, wherein each of said plurality of devices comprises an interface for synchronous status polling across each of said devices.

11. The apparatus according to claim 1, wherein each of said plurality of devices comprises a clock synchronization interface that operates faster than a system clock.

12. The apparatus according to claim 1, wherein said data comprises a plurality of variable sized packets.

13. The apparatus according to claim 1, further comprising:
    a bidirectional bus configured to communicate said one or more bidirectional control signals.

14. The apparatus according to claim 1, wherein said one or more bidirectional control signals comprise queue expansion signals.

15. An apparatus comprising:
    means for storing and presenting data to a plurality of queues in a plurality of devices configured to receive (i) one or more first control signals configured to control data transfer and (ii) one or more second control signals for configuring said plurality of queues, wherein one or more of said one or more first and second control signals are bidirectional; and
    means for selecting one or more of said plurality of queues in response to one or more device identification bits.

16. A method for implementing queue expansion in multiqueue devices, comprising the steps of:
    (A) reading/writing data from/to a plurality of queues in a plurality of devices;
    (B) controlling transfer of said data in said queues in response to one or more first control signals;
    (C) configuring said plurality of queues in response to one or more second control signals; and
    (D) selecting one of said plurality of queues to be read/written from/to in response to one or more device identification bits, wherein one or more of said one or more first and second control signals are bidirectional.

17. The method according to claim 16, wherein step (B) further comprises:
    comparing queue/register address most significant bits.

18. The method according to claim 16, wherein step (A) further comprises:
    controlling writing into the plurality of queues in response to write queue address expansion most significant bits.

19. The method according to claim 16, wherein step (A) further comprises:
    controlling reading from the queues in response to read queue address expansion most significant bits.

20. The method according to claim 16, further comprising the step of:

controlling accesses to one or more registers belonging to the plurality of devices in response to write management register address expansion most significant bits.

21. The method according to claim 16, further comprising the step of:
    controlling accesses to one or more registers belonging to the plurality of devices read management register address expansion most significant bits.

22. The method according to claim 16, further comprising the steps of:
    interfacing tristatable output data busses for arbitration; and
    interfacing tristatable output control busses for arbitration.

* * * * *